United States Patent
Kokkinen et al.

(10) Patent No.: US 6,201,818 B1
(45) Date of Patent: *Mar. 13, 2001

(54) BI-DIRECTIONAL TELECOMMUNICATION LINK IN A CABLE TELEVISION SYSTEM

(75) Inventors: Heikki Kokkinen, Helsinki; Juha Pihlaja, Espoo, both of (FI)

(73) Assignee: Nokia Technology GmbH, Pforzheim (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/910,556

(22) Filed: Aug. 18, 1997

(30) Foreign Application Priority Data

Aug. 23, 1996 (FI) .......................................... 963293

(51) Int. Cl.[7] ........................................................ H04J 1/08
(52) U.S. Cl. ............................ 370/485; 370/496; 370/522
(58) Field of Search ................................... 370/395, 458, 370/480, 485–487, 498, 522, 524

(56) References Cited

U.S. PATENT DOCUMENTS

| | | | |
|---|---|---|---|
| 5,517,502 | 5/1996 | Bestler et al. ....................... | 370/94.2 |
| 5,570,355 | * 10/1996 | Dail ....................................... | 370/352 |
| 5,696,765 | * 12/1997 | Safadi ................................... | 370/436 |

FOREIGN PATENT DOCUMENTS

| | | |
|---|---|---|
| 9534168 | 12/1995 | (WO) . |
| 9610303 | 4/1996 | (WO) . |
| 9615599 | 5/1996 | (WO) . |

* cited by examiner

*Primary Examiner*—Chau Nguyen
*Assistant Examiner*—Soon-Dong Hyun
(74) *Attorney, Agent, or Firm*—Ware, Freesola, Van Der Sluys & Adolphson LLP

(57) ABSTRACT

In a digital cable television system or a Hybrid-Fiber-Cable (HFC) system at least two control channels (104) of the out-of-band type are arranged to control the same upstream data transmission channel (107), whereby their capacity can be combined in order realize downstream data transmission in parallel with downstream high capacity data transmission. Applied in the DAVIC system the overhead bits (110a, 110b) of the SL-ESF frames (108a, 108b) of the co-ordinated control channels, and the R-bytes (R1a to R8c) of the SL-ESF payload indicating to which channel the control is directed, are made identical.

9 Claims, 5 Drawing Sheets

BI-DIRECTIONAL TELECOMMUNICATION LINK IN A CABLE TELEVISION SYSTEM

BACKGROUND OF THE INVENTION

1. Technical Field of the Invention

The invention relates generally to a bi-directional data communication link in a cable television system, and particularly to an increased downstream data transmission capacity in a system having a control channel of the so-called out-of-band type for transmitting information from the central equipment to the terminals.

2. Discussion of Related Art

A cable television system is usually a tree-like distribution network having at the root a main amplifier or the so-called head-end of the operator which controls the network. More generally the main amplifier can be called the central equipment. The distribution lines are branched in a tree-like fashion towards the terminals of the subscribers, of which there can be even hundreds of thousands under the same central equipment. In order to prevent signal weakening and to reduce interference the distribution lines have distribution amplifiers, repeaters and other devices known per se.

Plans to change the cable television systems from unidirectional distribution networks into bi-directional data transmission networks have been presented recently. Then the data transmission direction from the central equipment to the terminals is generally called downstream, and the opposite direction is called upstream. In addition to the high capacity downstream channel the system comprises at least one upstream channel, through which the terminals can transmit information towards the central equipment, and a downstream control channel with a relatively low capacity, through which the central equipment controls the use of the upstream links. The control channel can comprise cyclically repeating fields which the central equipment multiplexes into the digital video picture or other signal transmitted on the main channel by utilizing its frame structure. Such a control channel is of the so-called in-band control channel type. In another embodiment the control channel is located on a frequency band of its own, whereby it is a so-called out-of-band control channel. This invention relates primarily to systems where the control channel is of the out-of-band type.

The invention can be applied e.g. in digital video systems known per se, i.e. DAVIC (Digital Audio Visual Council) and DVB (Digital Video Broadcasting). Definitions relevant to the invention are presented in the publications "DAVIC 1.0 specification part 08; Lower layer protocols and physical interfaces, December 1995", "DAVIC 1.0 corrigenda part 08; Lower layer protocols and physical interfaces, Edited version after New York meeting, Rev. 2.1, June 1996", "DAVIC 1.1 specification baseline document #18. Cable modem baseline document, Rev. 2.0, as of New York meeting, June 1996" and "ETSI draft specification prETS 300 800; Digital video Broadcasting (DVB); DVB interaction channel for Cable TV distribution system (CATV). TM 1640 Rev. 4, June 1996". The cable television system presented in the publications can be based on coaxial cables or at least partly on optical fibers, whereby in the last mentioned case it is also called an HFC network (Hybrid Fiber Coax).

FIG. 1 shows the proposal in the publication prETS 300 800 for dividing the frequencies in the DVB system. The dimensions on the horizontal axis in the figure are illustrative, and the vertical axis only shows which signals are directed from the central equipment to the terminals (DS, upwards in the figure) and which signals are directed in the opposite direction (US, downwards in the figure). The frequency band 101 extends from about 50 MHz to almost 900 MHz, and typically it is divided into channels 102 with a typical width of 6 to 8 MHz, of which only three are shown for the sake of clarity. Each channel carries one QAM modulated (Quadrature Amplitude Modulation) signal, which can contain one or more digital video signals in the MPEG-TS format (Motion Picture Experts Group— Transport Stream) or other information requiring a high transmission capacity. The frequency band 103 extends from 70 to 130 MHz, and it contains channels 104 with a width of one or two MHz, each carrying one QPSK modulated (Quadrature Phase Shift Keying) control channel. Also here only three channels are shown for the sake of clarity. The frequency band 105 extends from 300 to 862 MHz, and its contents corresponds to that of the frequency band 103. In the figure the frequency band 106 extending from 5 to 65 MHz is reserved for the upstream links, and it contains channels 107 of which the figure shows only three, each having a width of 200 kHz, 1 MHz or 2 MHz. It is planned to use the QPSK modulation also on these upstream links. The object is to use QPSK modulation also on the upstream links. However, the new definitions for the DAVIC system also provides for the use of QAM modulation on the low capacity channels.

The communication on each upstream channel is divided into nine cyclically repeated time slots. The central equipment determines how these time slots are used, so that some of the time slots can be used for ranging, which aims at the measurement and compensation of transfer delays, and some of the time slots can be freely used by the terminals in a kind of reservation contest, and according to a particular reservation list some of them are assigned to be used by terminals which have made reservations, and some of the time slots are used according to a time schedule, which guarantees a certain regular data transmission capacity for a link. In the DAVIC system the central equipment transmits on one downstream control channel information regarding the use of up to eight upstream channels. The transmission of this information on the downstream control channel is described in more detail below.

According to FIG. 2 the transmission on the control channel comprises SL-ESF frames 108 (Signalling Link Extended Superframe). The length of one SL-ESF is 4632 bits and it is divided into 24 frames of 193 bits. In FIG. 2 the frames are numbered sequentially from 1 to 24, and further one frame is enlarged and marked by the reference numeral 109. At the beginning of each frame there is a so-called overhead bit 110, which is followed by the payload section 111 comprising 192 bits. The significance of the overhead bit depends on which frame in the SL-ESF is considered. In the SL-ESF frames with the sequential number 4, 8, 16, 20 and 24 the overhead bit has a fixed value and functions as a frame alignment bit. Correspondingly, when the overhead bits in the frames 2, 6, 10, 14, 18 and 22 are placed in row they form a CRC checksum, which represents the bit contents of the previous SL-ESF. In every second frame the overhead bit starting from the frame number 1 is a so-called M counter, which indicates the timing of the time slots in the upstream channel controlled by this control channel.

The payload of the SL-ESF is obtained by writing the payload sections of all frames in sequence, beginning with the payload section of frame number 1 and ignoring the overhead bits. The SL-ESF payload is usually written in the form of the table below:

| Row No. | 2 bytes | | 53 bytes | 2 bytes | 1 byte | 1 byte |
|---|---|---|---|---|---|---|
| 1 | R1a | R1b | ATM cell | RS | | |
| 2 | R1c | R2a | ATM cell | RS | R2b | |
| 3 | R2c | R3a | ATM cell | RS | | |
| 4 | R3b | R3c | ATM cell | RS | R4a | |
| 5 | R4b | R4c | ATM cell | RS | | |
| 6 | R5a | R5b | ATM cell | RS | R5c | |
| 7 | R6a | R6b | ATM cell | RS | | |
| 8 | R6c | R7a | ATM cell | RS | R7b | |
| 9 | R7c | R8a | ATM cell | RS | | |
| 10 | R8b | R8c | ATM cell | RS | T | T |

In the table the rows 1, 3, 5, 7 and 9 each have 57 bytes, the rows 2, 4, 6 and 8 each have 58 bytes, and the row 10 has 59 bytes. When the bytes Rxa–Rxc (where x is one of the integers 1 to 8) are placed one after another they form a field with the length of 24 bits, which contain information regarding the upstream channel defined by the integer x. If the downstream channel controls only one upstream channel, then the bytes, except the bytes R1a, R1b, R1c, are insignificant. Of said 24 bits the first bit instructs, when required, the terminals to measure and compensate for the time delays, the next six bits indicate the use of the time slots in the upstream channel, the next nine bits transmit acknowledgements of frames received earlier by the central equipment, the next two bits enable or disable capacity reservation attempts made by the terminals, and the last six bits form a checksum regarding the previous bits.

Each row contains an ATM cell of 53 bytes, which can contain information directed to a certain user, such as instructions (so-called MAC messages; Medium Access Control) regarding compensation of timing errors and distribution of upstream capacity, or transmitted information relating to an application. In order to detect and correct transmission errors the frame structure contains a Reed-Solomon code with a length of two bytes, which is marked RS in the table. The two bytes marked with T form the trailer of the payload.

The aim of the above presented arrangement, in which one downstream channel controls up to eight upstream channels, is that it is used mainly so that the control channel transmits very little information in addition to information relating to the use of the upstream channels. Actual downstream data transmission is carried on the high capacity QAM modulated main channels, through which a user can load a file to his or her terminal, for instance.

There will be a problem if a user wants to use his or her terminal for several purposes simultaneously. As an example we can examine a situation, in which the terminal in family use is a digital multimedia terminal, a so-called Set Top Box, which is connected to a large-sized display and has further an interface for a home computer. An arrangement of this type is shown in FIG. 3, where the reference numeral 112 represents the central equipment of a cable television operator, the reference numeral 113 represents a digital multimedia terminal, and the reference numeral 114 represents a home computer. The central equipment contains a plurality of main channel transmitter units 115, a plurality of control channel transmitter units 116, and a plurality of receiver units 117 for the upstream channels. The user terminal contains a tuneable receiver 118 for reception of the high capacity main channels, a second tuneable receiver 119 for reception of low capacity control channels, and a transmitter unit 120 in order to generate the upstream transmissions.

In the situation of the example the largest part of the family members want to watch a movie transmitted in a digital form (e.g. in the MPEG form; Motion Picture Experts Group) via the receiver, but one family member wants to utilize the bi-directional nature of the data transmission network and to scan through WWW pages (World Wide Web). In principle there are two alternative prior art solutions. According to the first alternative the operator equipment multiplexes the data required by the WWW user in the same downstream channel with the video picture. In the second alternative the operator reserves a whole high capacity QAM modulated channel for the video picture transmission and packs the WWW data into the ATM cells, which are transmitted on the downstream control channel.

The disadvantage of the above first mentioned alternative is that it requires facilities which present-day operators generally do not possess. In many cases the operators do not at all want to deal with the contents of the data transmitted on the high capacity downstream channel. The program is received as such from a satellite or other corresponding link, and the operator only controls its distribution via the cable network or the HFC network. In the second alternative the transmission of the file format data on the downstream control channel is easier to arrange according to present-day definitions and practices, but then the whole downstream capacity may be consumed. The situation is worsened by the fact that the relative number of low capacity channels is defined in the wrong way considering a typical home computer network user. For instance, data transmission between the home computer and the data network in order to scan WWW pages or to load public domain software is clearly asymmetric: the user transfers from the network to his or her computer amounts of data which are much greater than in the opposite direction. To meet this need there should be more downstream channels than upstream channels, rather than the opposite.

In another alternative embodiment the downstream data transmission is not even processed in the same device of the Set Top Box type, which is used to receive the main channel, but for this purpose there is a separate cable modem. Then the downstream data transmission can be totally separated from the transmission of the high capacity video picture. However, to a user it is frustrating to purchase separate devices, if the same object can be attained by one sufficiently versatile device.

SUMMARY OF INVENTION

The object of this invention is to present a method and an equipment with which the downstream data transmission can be arranged more effectively than before in a bi-directional distribution network utilizing control channels of the out-of-band type.

The objects of the invention are attained by co-ordinating the transmissions on a plurality of control channels so that a plurality of downstream control channels are tied to one upstream channel. Said control channels have the same upstream control information transmitted in the frame structure.

The method according to the invention for arranging data transmission in a digital data transmission system having at least one upstream channel and at least two downstream control channels of the out-of-band type for controlling upstream data transmission is characterized in that at least two control channels are arranged to control the same upstream data transmission channel, and simultaneously said at least two control channels are used to transmit data in the downstream direction.

The invention also relates to a data transmission system for realizing the above described method. The data transmission system according to the invention is characterized in that the central equipment comprises control means for co-ordinating the transmission in the transmitter means of the control channels so that the control transmitted by them concerns the same upstream data transmission channel.

The basic idea of the invention is that the ratio of the downstream and upstream capacities of the data transmission system are dimensioned so that they better meet the needs arising for instance from the network use of a home computer. In practice this is realized so that the central equipment makes the structures controlling the data transmission on several control channels to be identical, whereby the receivers monitoring different control channels can use the same channel in the upstream direction. In the DAVIC system the control structures then mean the overhead bits (except for the CRC bits) of the frames and the R-bytes of the SL-ESF payload. The data ordered by the terminal is packed by the central equipment into the ATM cells contained in the co-ordinated control channels. The ATM cell contents of a control channel will not depend on the contents of other control channels.

These and other objects, features and advantages of the present invention will become more apparent in light of the detailed description of a best mode embodiment thereof, as illustrated in the accompanying drawing.

DETAILED DESCRIPTION OF PREFERRED EMBODIMENTS

Figure 1:
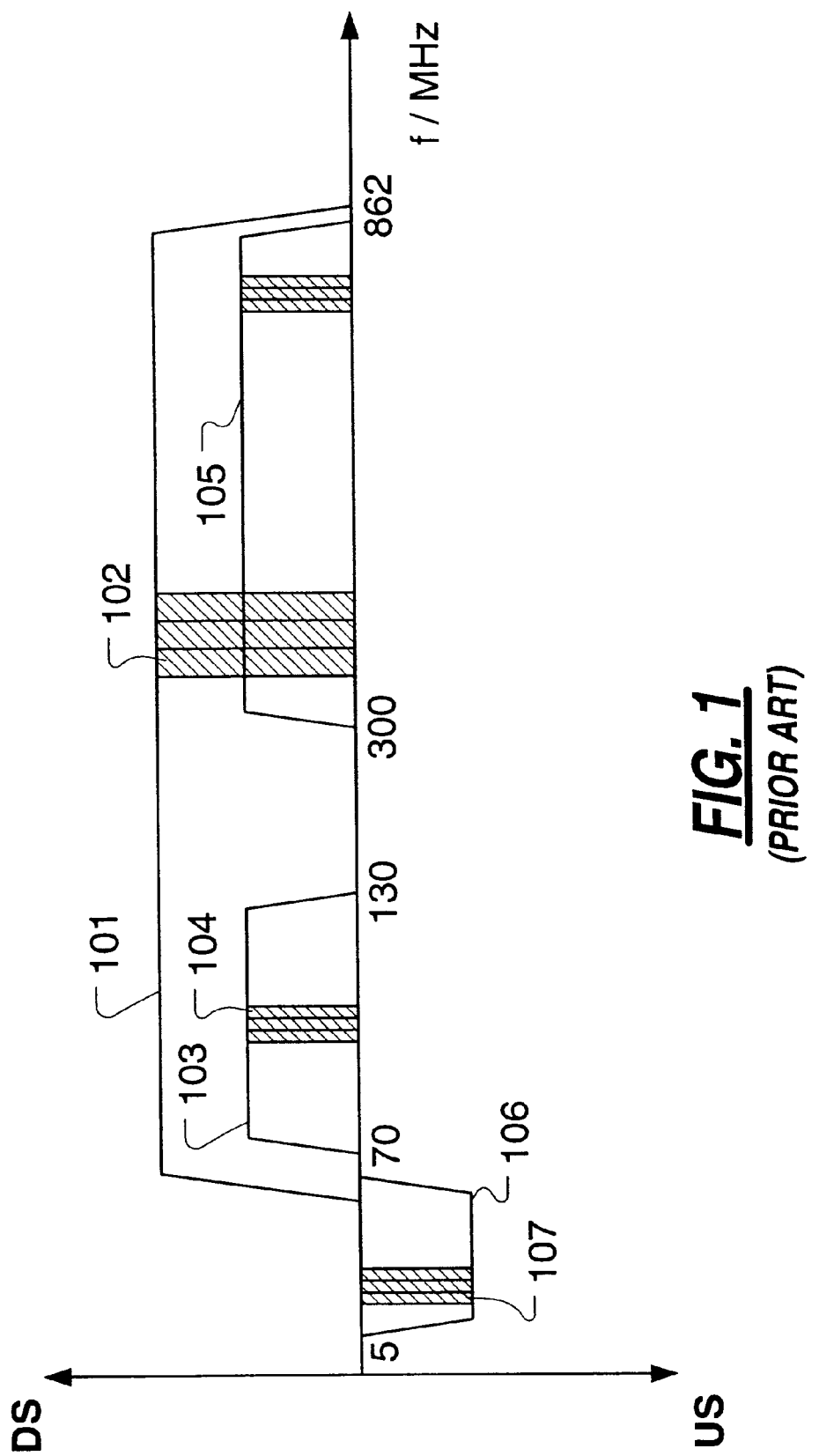
FIG. 1 shows a known proposal to divide the frequencies in the DVB system.
Figure 2:
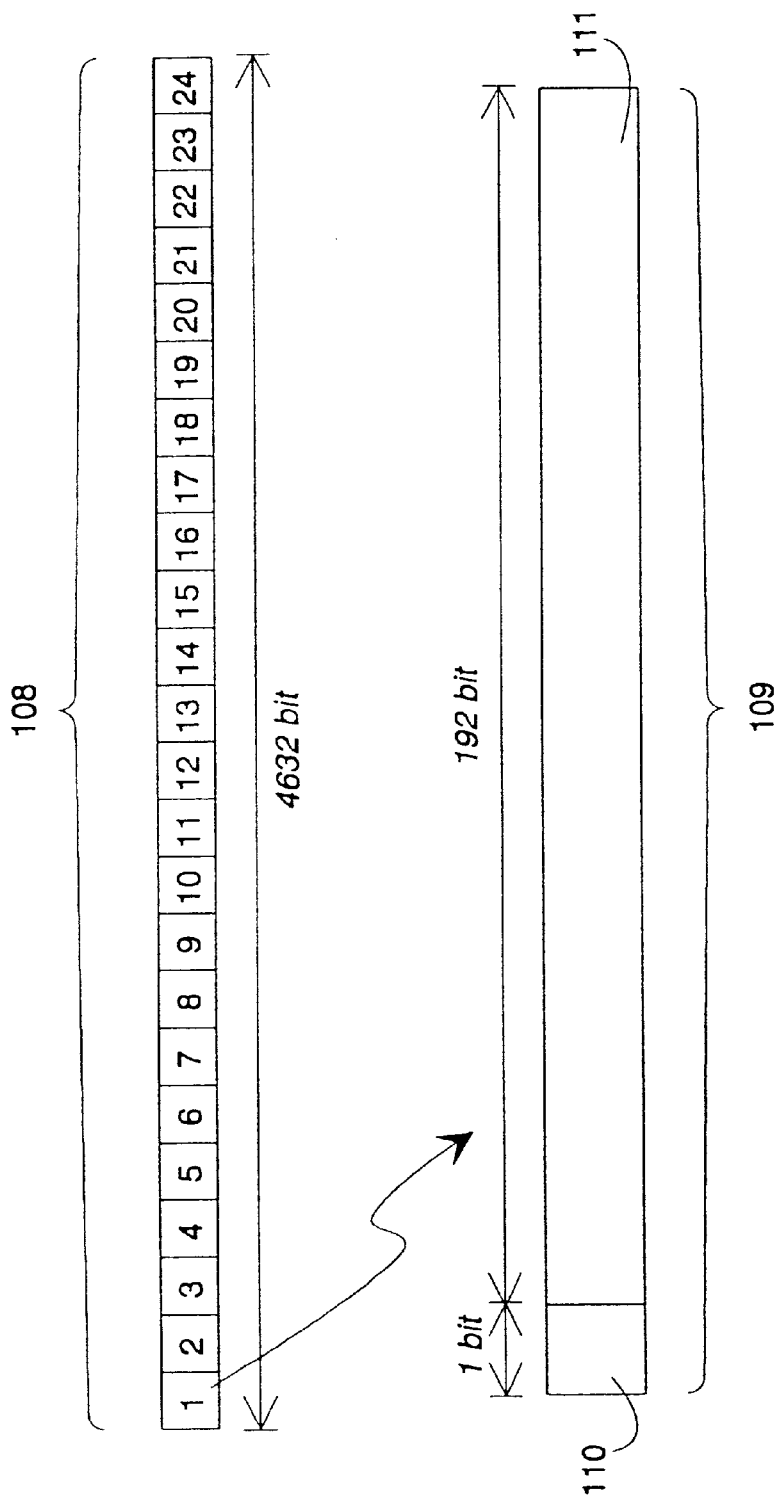
FIG. 2 shows how the transmission is divided in a known control channel.
Figure 3:
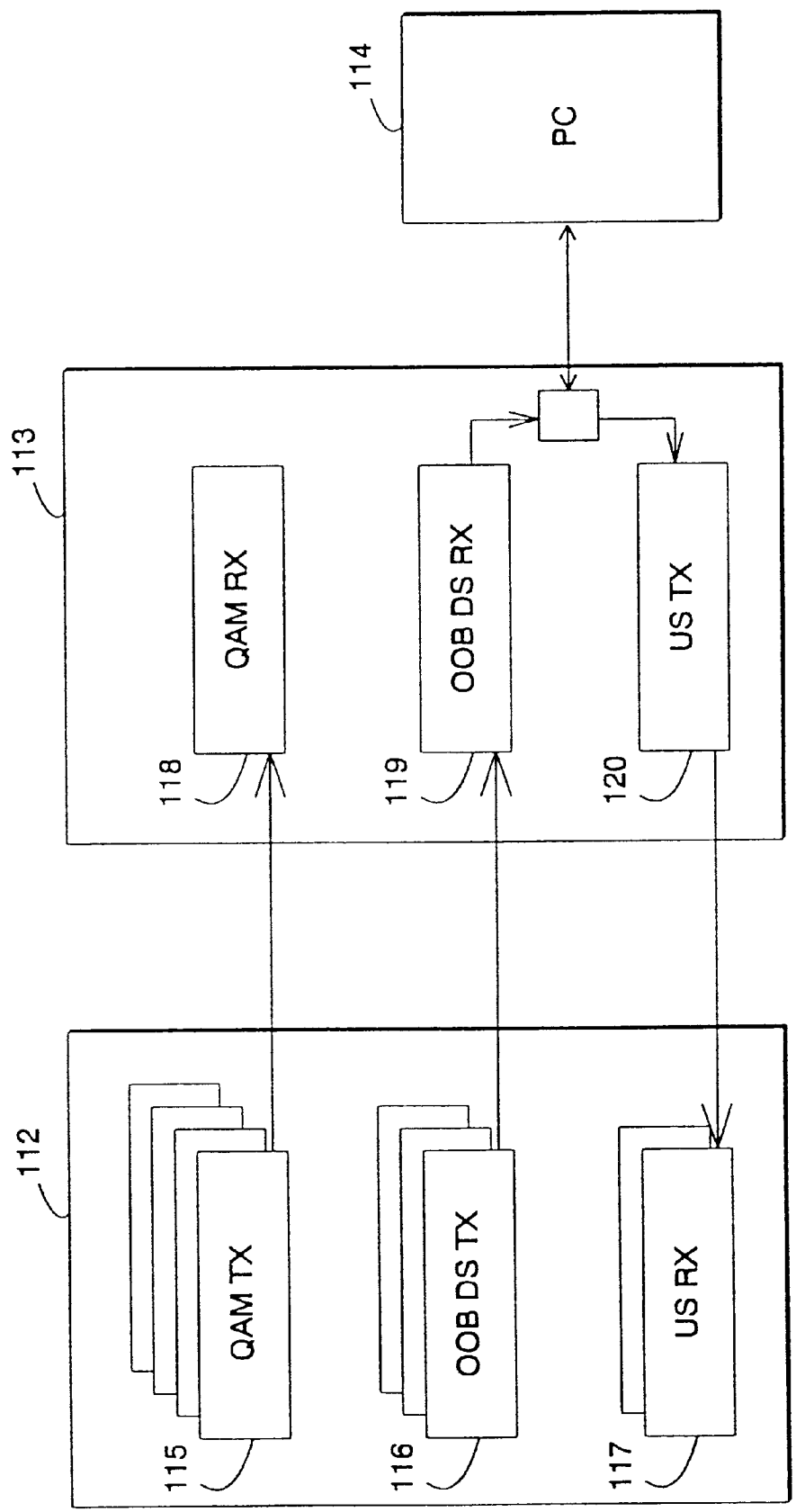
FIG. 3 shows a known data transmission system.

Above reference was made to the FIGS. 1 to 3 in connection with the description of prior art, so that in the following description of the invention and its preferred embodiments reference is made mainly to FIGS. 4 and 5. The same reference numerals are used for corresponding parts in the figures.

Figure 4:
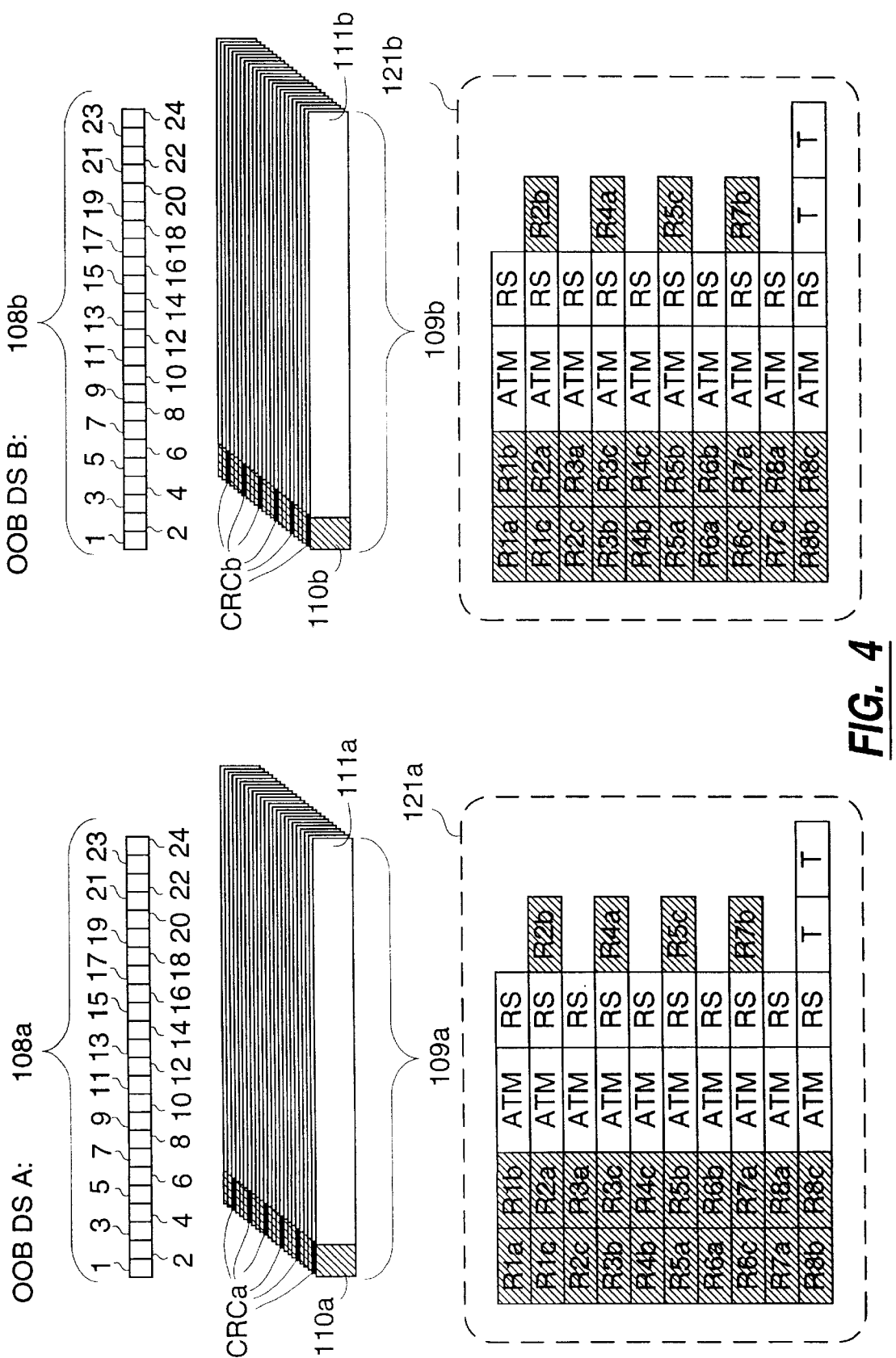
FIG. 4 shows co-ordination of the control channels in accordance with the invention.
Figure 5:
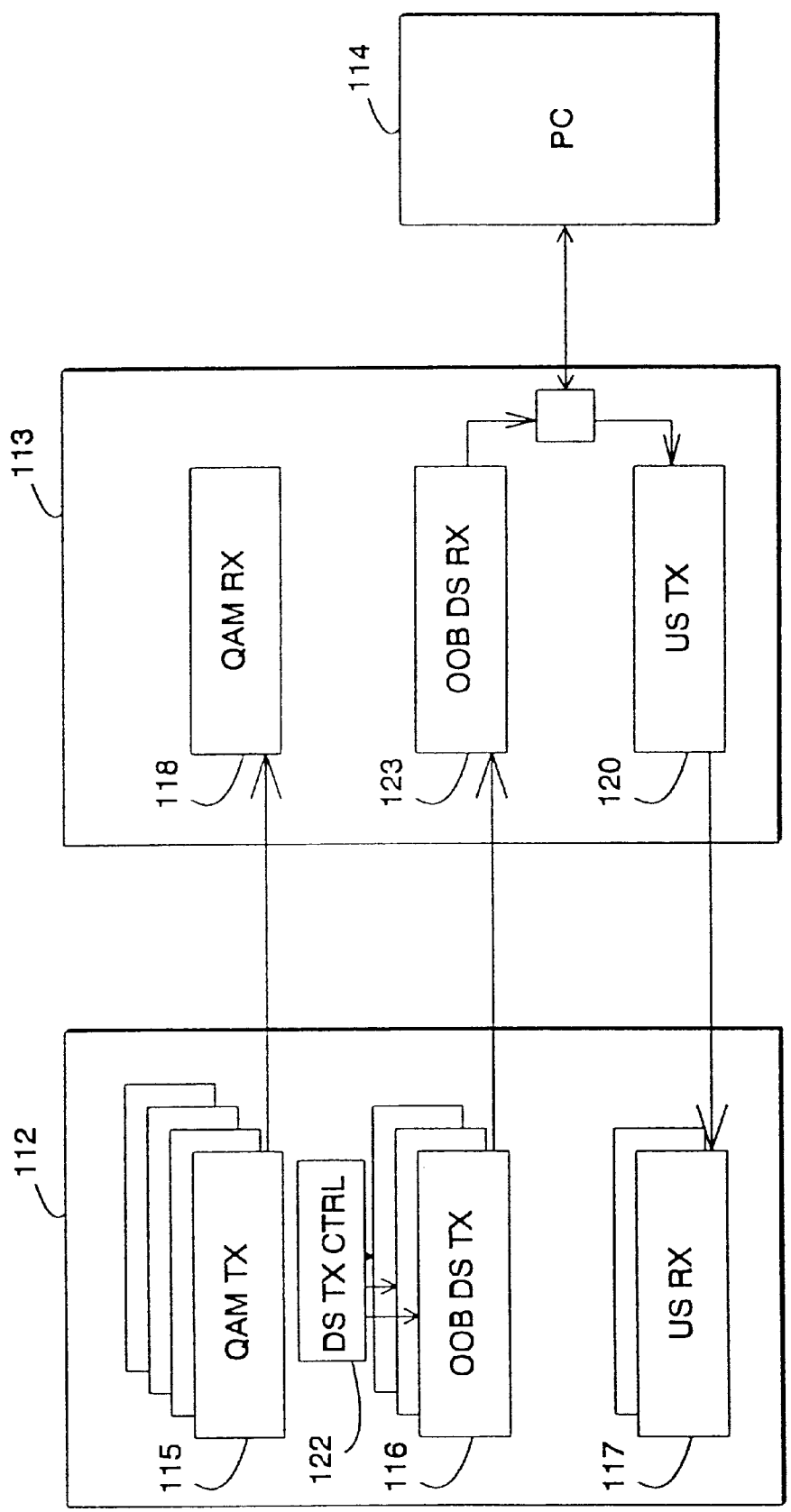
FIG. 5 shows a data transmission system according to the invention.

FIG. 4 shows how the transmission is divided on two downstream control channels, which are marked as OOB DS A and OOB DS B. On both channels the transmission is divided into SL-ESF frames 108a, 108b in the same way as was shown above in the description of prior art. Each frame 109a, 109b contained in the SL-EFS comprises an overhead bit 110a, 110b and a payload section 111a, 111b. The payload of SL-ESF 121a, 121b comprises R-bytes, ATM cells, RS checksums and trailers marked by T. In order to utilize the downstream data transmission more efficiently the signal sections shaded in FIG. 4 are identical on both control channels. Of the overhead bits the bits CRCa and CRCb conveying the checksums are not identical, and they are marked with a solid black color, but the other 18 overhead bits are identical on both channels. The R-bytes in the SL-ESF payload are identical on both channels.

In the arrangement shown in FIG. 4, where all R-bytes from R1a to R8c are marked in the SL-ESF payload, the two control channels OOB DS A and OOB DS B are identical regarding the frame information and they can in principle control eight upstream channels. However, in a preferred embodiment of the invention the shown two control channels control only one upstream control channel, because the object of the invention is to invert the capacity ratios of upstream and downstream data transmission so that substantially more data can be transmitted in the downstream direction than in the upstream direction. Then of the R-bytes only the bytes R1a, R1b and R1c have any significance. In FIG. 4 two downstream control channels are co-ordinated in a manner according to the invention, but in the same way it is possible to co-ordinate also more downstream channels according to the respective requirements. In all co-ordinated channels all overhead bits, except the CRC bits, and the R-bytes of the SL-ESF payload are identical.

Because the frame alignment information and the M counter information transmitted as overhead bits are identical, they will give to the user terminals identical information about the timing of the corresponding upstream channel. This is natural, because said co-ordinated control channels control the same upstream channel; if different timing information would be transmitted by the two control channels, then the terminals monitoring different control channels would use the same upstream channel according to conflicting instructions. The R-bytes contained in the SL-ESF payload convey to the terminals information about whether the ranging function has to be used on the jointly controlled upstream channel, about the access types of the time slots of the upstream channels, and whether the previous upstream frames have been received correctly, and whether it is allowed to transmit reservation requests on the upstream channel. The MAC messages controlling how time slots in the upstream channel are distributed between the terminals can be transmitted in any ATM cells belonging to SL-ESF payload on any of the co-ordinated control channels.

In a cable television system or a corresponding data transmission system the invention requires that the transmitters generating the signals of the downstream and upstream control channels of the out-of-band type can be mutually co-ordinated, so that the required structures controlling the upstream data transmission can be made identical. A block 122 of the central equipment controls the operation of the control channel transmitters 116 in the data transmission system according to FIG. 5, this data transmission system being similar to the prior art system, which was described above with reference to FIG. 3. The higher number of downstream channels compared to the number of upstream channels in the network is realized so that the block 122 co-ordinates a required number of downstream control channels by instructing the transmitters to use identical overhead bits (except the CRC bits) in the frames and identical R-bytes in the SL-ESF payloads. The terminal's 113 tuneable receiver 123 receiving control channel signals is substantially similar to those in prior art terminals. In an alternative embodiment the terminal 113 can contain several control channel receivers, whereby it can reserve capacity for its use even from several co-ordinated control channels simultaneously.

In the bi-directional cable television networks or HFC networks of the type described above the present invention transforms the capacity ratios of the upstream and downstream data transmission so that the number of the downstream control channels and their combined capacity is higher than the number and capacity of the upstream channels when required. This is advantageous regarding common data network utilization. The method and the data transmission system according to the invention can be adapted almost in real time to the users' changing needs, so that their operation is flexible and the available equipment resources will always be utilized optimally. The invention requires only slight changes in existing contracts and standards, which is favorable regarding international telecommunication co-ordination. The object of the examples in the description is to illustrate the possible embodiments of the invention, and they do not limit the invention to any single embodiment. Thus, although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A method for arranging bi-directional data transmission in a digital data transmission system having at least one upstream data transmission channel (107) having cyclically repeating timeslots occupying a defined frequency band and at least two downstream control channels (104) having cyclically repeating frames for controlling data transmission upstream, each downstream control channel occupying a separate frequency band in a grouping of downstream control channels distinct from a grouping of downstream data transmission channels each also occupying a separate frequency band, characterized by controlling a same upstream data transmission channel of said at least one upstream data transmission channel with said at least two downstream control channels, and by simultaneously transmitting data downstream using said at least two downstream control channels.

2. A method according to claim 1, wherein said frames (108, 109) are arranged with a controlling section (110, R1a–R8c) and a section (111, ATM) of transmitted data characterized by transmitting simultaneous frames (108a, 108b, 109a, 109b) on said at least two downstream control channels, wherein a substantial part of the controlling sections (110a, 110b, R1a–R8c) of the simultaneous frames are identical.

3. A method according to claim 2, characterized by organizing said frames of each downstream control channel as subframes of a signaling link extended superframe (SL-ESF) comprising a linear sequence of twenty-four of said subframes, wherein preceding each of those twenty-four subframes are twenty-four corresponding non-contiguous overhead (OH) bits serving as a prefix to twenty-four bytes of subframe payload, wherein the twenty-four bits of OH appear within each SL-ESF frame, by conveying with each subframe payload reception indicator fields for controlling a certain upstream channel, and wherein on said at least two downstream control channels overhead bits, except for checksum bits (CRCa, CRCb), and reception indicator fields of said payload section are identical.

4. A method according to claim 2, characterized by arranging said frames as subframes of a signaling link extended superframe (SL-ESF), each subframe having an overhead bit and a payload section, whereby the payload section of each of the SL-ESF subframes contains in a form of R-bytes information which relates to a certain upstream channel, and that on said at least two control channels overhead bits, except for checksum bits (CRCa, CRCb), and R-bytes of said payload section are identical.

5. A digital transmission system for arranging bi-directional data transmission, the data transmission system having central equipment (112) and terminals (113), of which said central equipment comprises:

receiver means (117) for receiving upstream transmitted data from at least on one upstream data transmission channel having cyclically repeating timeslots occupying a defined frequency band; and transmitter means (116) for transmitting control data downstream on at least two control channels in order to control upstream data transmission, each downstream control channel occupying a separate frequency band in a grouping of downstream control channels distinct from a grouping of downstream data channels each also occupying a separate frequency band;

wherein said terminals each comprise:

receiver means (118, 123) for receiving the downstream transmitted control data, and transmitter means (120) for transmitting the upstream transmitted data on the at least one upstream data transmission channel, characterized by control means (122) in said central equipment for co-ordinating the transmission of downstream control data by said transmitter means so that the control data on at least two downstream control channels control a same upstream data transmission channel.

6. A data transmission system according to claim 5, characterized in that said system comprises at least two receiver means for receiving simultaneously the control data transmitted by said at least two downstream control channels.

7. A digital transmission system for arranging bi-directional data transmission, the data transmission system having central equipment (112) and terminals (113), of which said central equipment comprises:

first receiver means (117) for receiving upstream transmitted data from at least on one upstream data transmission channel having cyclically repeating timeslots occupying a defined frequency band; and first transmitter means (116) for transmitting downstream control data on at least two downstream control channels in order to control upstream data transmission, each downstream control channel having cyclically repeating frames occupying a separate frequency band in a grouping of downstream control channels distinct both from a grouping of downstream data transmission channels each also occupying a separate frequency band and from said frequency band of said at least one upstream data transmission channel;

wherein said terminals comprise:

second receiver means (118, 123) for receiving the downstream control data, and second transmitter means (120) for transmitting the upstream transmitted data on the upstream data transmission channel, said system characterized by control means (122) in said central equipment (112) for co-ordinating the downstream control data in said first transmitter means (116) so that the downstream control data on at least two downstream control channels control a same upstream data transmission channel.

8. A data transmission system according to claim 7, characterized in that said system comprises at least two receiver means for receiving simultaneously the downstream control data transmitted by said at least two downstream control channels.

9. A data transmission system according to claim 7, characterized by said at least two downstream control channels simultaneously transmit data with said control data.

* * * * *